Feb. 13, 1968           J. W. GRANT           3,369,149
IGNITION TIMING LIGHT WITH A SATURATED CORE TRANSFORMER
FOR PLURAL VOLTAGE INPUTS
Filed Nov. 10, 1966           3 Sheets-Sheet 1
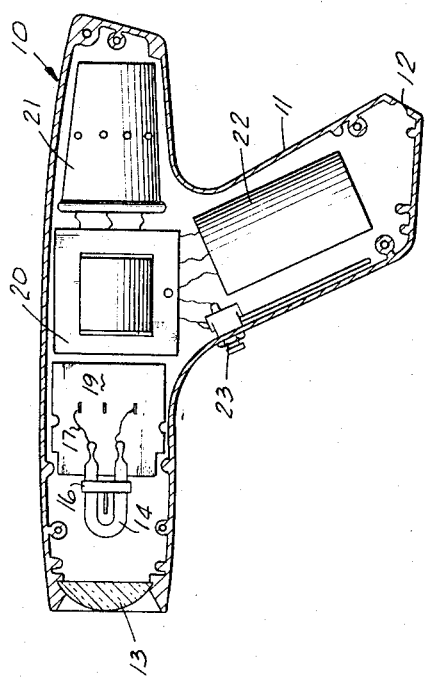
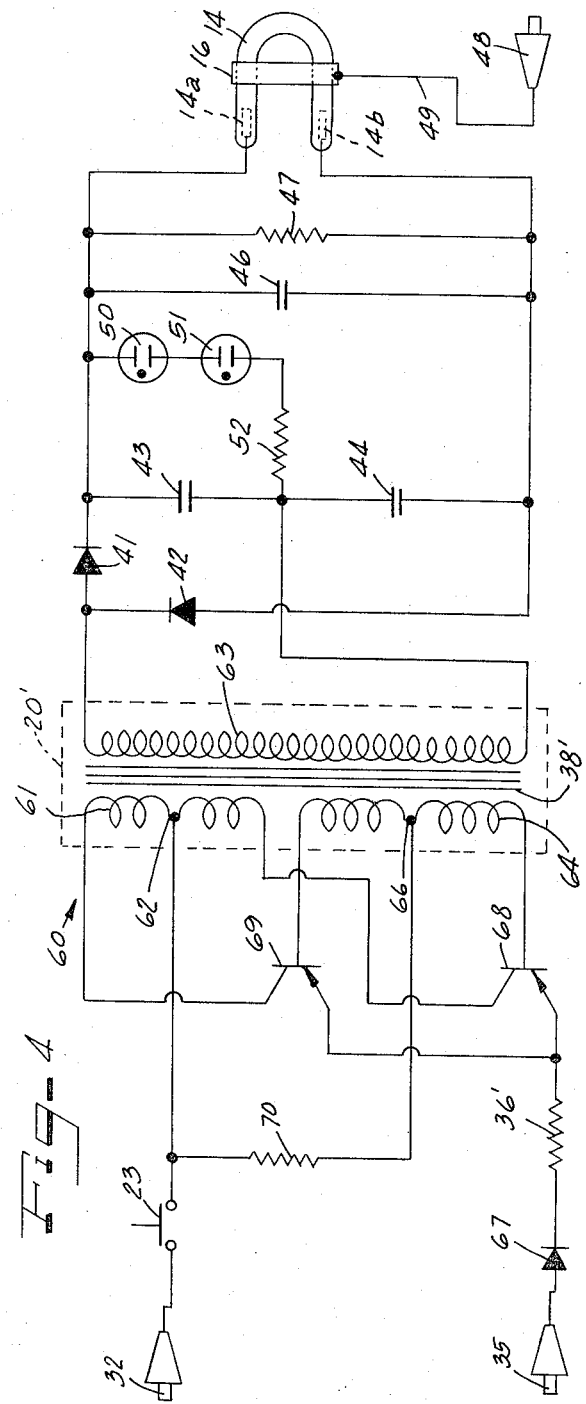
INVENTOR.
JAMES W. GRANT
BY Hill, Sherman, Meroni, Gross & Simpson ATTORNEYS

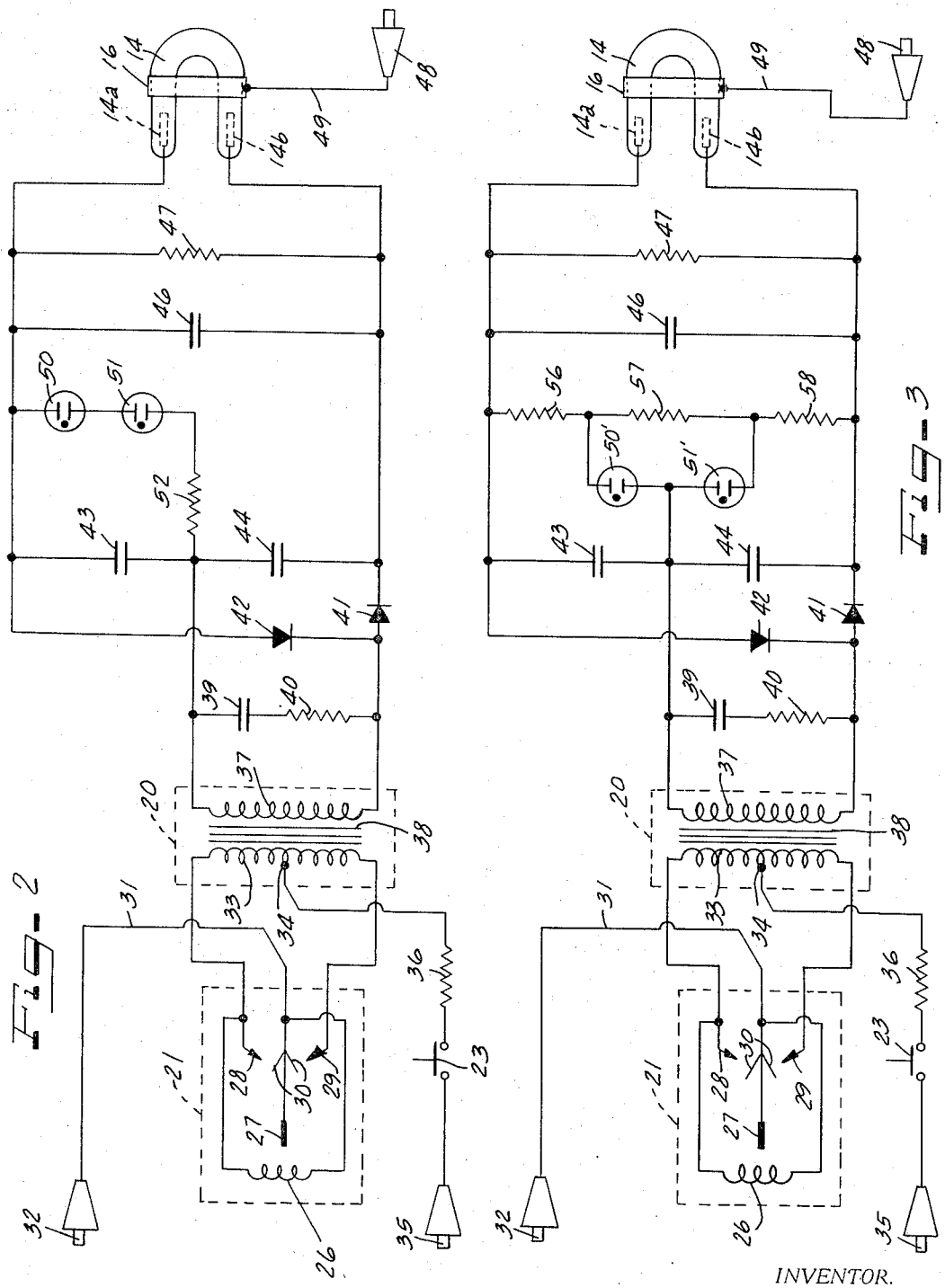

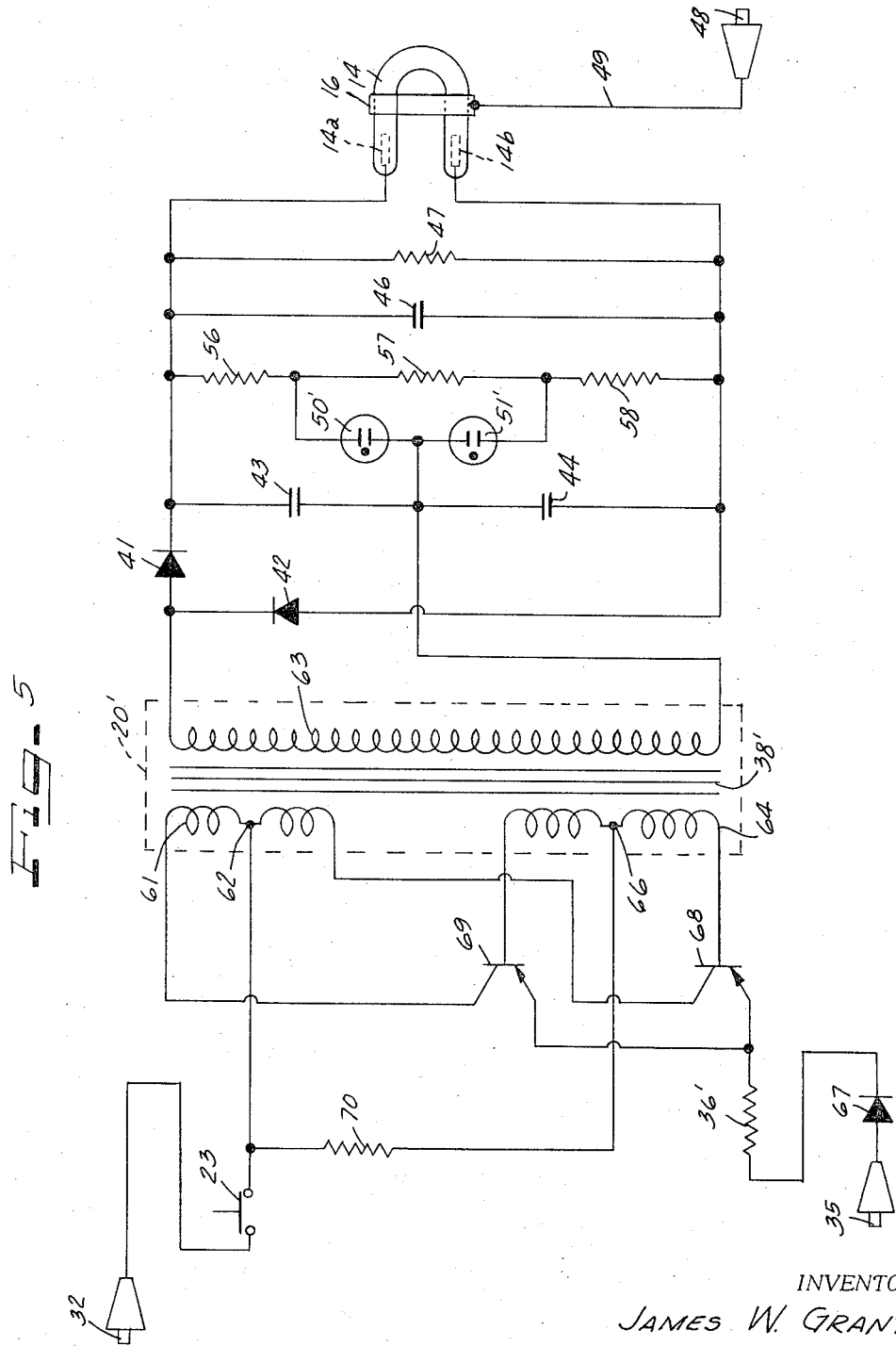

United States Patent Office 3,369,149
Patented Feb. 13, 1968

3,369,149
IGNITION TIMING LIGHT WITH A SATURATED CORE TRANSFORMER FOR PLURAL VOLTAGE INPUTS
James W. Grant, Evanston, Ill., assignor to Peerless Instrument Company, Chicago, Ill., a corporation of Illinois
Filed Nov. 10, 1966, Ser. No. 593,431
5 Claims. (Cl. 315—168)

ABSTRACT OF THE DISCLOSURE

An ignition timing light for operation from either twelve or six volt automobile batteries. A DC to AC converter has the input thereof arranged for connection to the automobile battery and the output thereof connected to a step-up transformer which includes a core of magnetically saturable material. The transformer is designed to be fully saturated when the timing light is connected to a six volt battery, and therefore the transformer would also be saturated when connected to a twelve volt battery. The saturable core transformer produces a substantially constant output voltage when the timing light is connected to either a six volt or twelve volt battery. The output of the transformer is connected to a rectifier circuit which, in turn, is connected to a flash tube which includes synchronizing means to initiate ionization of the flash tube.

---

The invention set forth herein is directed to a stroboscopic testing device which has particular utility when used as a timing light for the testing or setting of ignition timing of internal combustion reciprocating engines. The stroboscopic testing device of the present invention is connectable to a battery or DC power source for receiving energizing current for a light emitting flash tube which forms part of the stroboscope. When using the stroboscope as a timing light for testing or setting of ignition timing of an automobile engine, it is convenient to utilize the automobile battery as the power source for the stroboscope. However, the battery of one automobile may have a voltage value which is different than the battery of another automobile. For example, automobiles may have either a six volt battery or a twelve volt battery. Therefore, the timing light device of the present invention is provided with automatic voltage regulation means which compensates for the different values of voltage to which it may be connected.

In general, it is common to use stroboscopic light flashing devices for stopping motion of a rotating engine part such as a fly wheel. A predetermined mark or position of the fly wheel is periodically illuminated by light pulses from the stroboscopic device for the purpose of determining whether or not the spark plugs of the engine are firing at the proper time with respect to the reciprocation of the cylinders.

The stroboscopic device or timing light which is used to obtain ignition timing information receives energy from such engine components as the ignition coil or magneto, engine battery, or from a self-contained power source within the timing light.

The stroboscopic light flashing device of the present invention relates to a timing light which is powered from an internal power supply, such as the battery of an automobile. Current from the automobile battery is delivered through a vibrator-transformer power converter circuit, or a transistor oscillator power converter circuit to a light emitting flash tube of the type which is ignited under the control of electric impulses generated by the spark system of the automobile engine. Although timing lights have heretofore been known which are connectable to either a six volt or a twelve volt battery, they require expensive relays to set the circuit for one voltage or the other. Such relays are not always reliable in operation, particularly if the battery voltage to which it is connected is not up to its standard rated voltage. Furthermore, prior art timing lights which are usable on either six volt or twelve volt battery systems employ a ballast resistance circuit in conjunction with the light flashing circuit in an attempt to regulate the current which is drawn from either a six volt battery or a twelve volt battery. Therefore the amount of light which is developed by the timing light is limited.

Still another type of prior art timing light which is intended for use with both six volt and twelve volt systems incorporate a vibrator-transformer converter which has a high reactance transformer for delivering AC voltage to a voltage doubling circuit which employs two selenium diodes. These diodes are selected to have a reverse breakdown voltage which is only slightly greater than the maximum inverse voltage which is encountered when the timing light is connected to a six volt system. Although this system is found to give excellent regulation of the polarizing voltage applied to the flash tube over the desired range of battery voltages, it is difficult to obtain selenium diodes at a moderate cost while having the desired electrical characteristics.

The timing light of the present invention provides a novel circuit arrangement which is incorporated in a timing light of general configuration resembling a gun which has a push-button switch at a trigger position on a handle or grip, and which switch is depressed when the light is to be energized for ignition timing purposes.

It is desirable that the timing light be small, light in weight, rugged in construction, and totally enclosed within the gun casing, and that the gun casing be formed of strong plastic material with good electrical isolating properties to protect the user from being exposed to high voltage ignition potentials.

Therefore, one of the primary objects of the present invention, particularly from a mechanic's standpoint, is to provide a novel timing light which is safe, rugged, self-contained and convenient to use, and which timing light is in the form of a gun.

Another object of the present invention is to provide a novel stroboscopic timing light incorporating a current limiting resistor or a current controlling resistor which is used in conjunction with a special step-up transformer to provide automatic voltage control independent of the value of the voltage source to which it is connected.

A feature of the present invention is in the provision of an electrical network formed of resistors and glow lamps which is connected to a full wave voltage doubling circuit to provide additional regulation of the polarizing voltage which is delivered to a flash tube to further improve the operation of the timing light when connected to either a six volt or a twelve volt battery.

Briefly, one form of the present invention utilizes a current limiting resistor in conjunction with a light flash circuit to limit the current supplied from a twelve volt battery to a value which may be safely and reliably interrupted by the contacts of an electromechanical vibrator. Still another form of the present invention utilizes a current controlling resistor which is connected in the emitter circuit of a transistor oscillator arrangement. The current controlling resistor limits the amount of current, which is supplied by a twelve volt battery, to a value that may be safely and reliably carried by the transistors. An important feature of the present invention is in the provision of a step-up transformer having a magnetic core which becomes substantially fully saturated when the timing light is connected to a six volt source. That is, the magnetic core of the step-up transformer used in the light flashing circuit is designed to operate under conditions of maximum primary current at a point near the saturation flux-density value of the core magnetic material when the timing light is connected to the lowest voltage of the range of voltages at which it is designed to operate. Therefore, when the timing light is connected to a higher voltage, the magnetic core of the step-up transformer will be fully saturated thereby providing substantially the same output voltage at the secondary of the transformer. Therefore, the voltage produced by the step-up transformer will be relatively independent of the value of the external DC voltage source. Additionally, the timing light of the present invention utilizes an electric network formed of resistors and glow lamps in novel circuit arrangements connected to the full wave voltage doubler circuit in a manner intended to provide further voltage regulation of the electric light flashing circuit.

Other objects and features will be more fully realized and understood from the following detailed description when taken in conjunction with the accompanying drawings in which like reference numerals throughout the various views of the drawings are intended to designate similar elements or components and wherein:

FIGURE 1 is a plan view showing the internal construction of the ignition timing light of the present invention;

FIGURE 2 is a schematic wiring diagram showing one form of the ignition timing light circuit of the present invention;

FIGURE 3 is a schematic wiring diagram showing a modification of the wiring circuit of FIGURE 2;

FIGURE 4 is a schematic wiring diagram showing another form of the timing light circuit of the present invention; and FIGURE 5 is a schematic wiring diagram showing a modification of the timing light circuit of FIGURE 4.

Seen in FIGURE 1 is a timing light which is constructed in accordance with the principles of this invention. The timing light includes a housing 10 which has a handle or grip 11 formed thereon. The handle 11 is provided with an aperture 12 for receiving a plurality of cables, such as the power cables which are connected to a battery, and the high tension pick-up cable which is connected to one of the spark plugs of an automobile. Mounted at one end of the housing 10 is a lens 13 which is immediately adjacent a light emitting flash tube 14. The flash tube 14 is provided with an excitation grid 16 which is used to initate the energization of the flash tube. The flash tube 14 is connected via a pair of leads 17 and 18 to a circuit board 19 which is mounted within the interior of the housing 10. The circuit board 19 holds many of the components which are necessary for operation of the timing light.

Also mounted within the housing 10 is a transformer 20, a vibrator 21, and a condenser can 22. The condenser can 22 is preferably of the multiple condenser type having three or more capacitors therein. A switch 23 is mounted within the handle 11 in a position which is easily accessible when the handle is grasped by an operator.

For a better understanding of the circuit arrangement of the timing light of the present invention, reference is now made to FIGURE 2. The vibrator 21 is provided with an energizing coil 26 for moving from side to side a vibrating element 27. A pair of stationary contacts 28 and 29 are alternately engaged by a movable contact 30 which is formed as part of the vibrating element 27. The movable contact 30 as well as the energizing coil 26 are connectable to a battery of a motor vehicle or the like through a lead 31 and a clip 32.

The transformer 20 includes a primary winding 33, which has the ends thereof connected to the stationary contacts 28 and 29 and a center tap 34 which is connected to a clip 35 through a current limiting resistor 36 and the switch 23. Furthermore, the transformer 20 is provided with a secondary winding 37 and a core of magnetic material 38. The core of magnetic material 38 is selected so as to be substantially saturated by the magnetic field developed in the primary winding 33 when the timing light circuit is connected to a six volt battery. The current limiting resistor 36 is selected to provide sufficient current flow in the primary winding 33 to cause substantial saturation. Therefore, when the timing light is connected to a battery of higher voltage, for example, twelve volts, the core 38 of the transformer 20 will become fully saturated thereby causing substantially the same output in the secondary winding 37.

Since the timing light of the present invention is designed to be operated by either a six or a twelve volt battery supply, the secondary winding 37 is shunted by a capacitor 39 and a resistor 40 to provide broad tuning of the secondary circuit. The capacitor 39 and resistor 40 serve to improve the wave form at the output of the transformer. Connected to the secondary winding 37 is a pair of diodes 41 and 42 and a pair of capacitors 43 and 44. The diodes 41, 42 and capacitors 43, 44 are connected in a voltage doubling circuit arrangement so as to increase the potential applied to the flash tube 14.

A storage capacitor 46 is connected across the voltage doubler circuit, and a bleeder resistor 47 is connected in parallel with the capacitor 46 and across the voltage doubler circuit. The resistor 47 provides a suitable load for proper operation of the voltage doubler circuit. The voltage developed across the storage capacitor is slightly less than the ionizing potential of the flash tube 14 and this voltage is applied to the electrodes 14a and 14b. A clip 48 is connectable to a spark plug lead of an automobile to deliver a signal impulse through a line 49 to the excitation grid 16 which is sufficient, when combined with the potential applied across electrodes 14a and 14b, to cause the flash tube 14 to be ionized. After the flash tube 14 has become ionized, the charge on capacitor 46 decreases, due to the conduction of the tube 14, to a value sufficient to cause tube 14 to be rendered nonconductive. After flash tube 14 has been rendered nonconductive, capacitor 46 will again charge to the potential of the voltage doubler circuit.

When the timing light of the present invention is connected to a twelve volt battery, the output of the transformer 20 is slightly increased, and so also is the output of the voltage doubler circuit. Therefore, a voltage regulator circuit is provided in circuit with the voltage doubler circuit to minimize the voltage variation. To accomplish voltage regulation in a simple and inexpensive manner, a pair of glow lamps 50 and 51 and a resistor 52 are connected in series, and this series combination is connected in parallel with the capacitor 43. The regulator circuit, comprising glow lamps 50 and 51 and resistor 52, is designed to be inoperative when the timing light is connected to a six volt DC source. However, when the timing light is connected to a DC source of higher potential, the voltage regulator circuit becomes operative to maintain the potential applied to the electrodes 14a and 14b at substantially the same value as when the timing light is connected to a six volt DC source.

Seen in FIGURE 3 is a modified form of the circuit arrangement shown in FIGURE 2. The circuit arrangement of FIGURE 3 is substantially the same as that of FIGURE 2 with the exception of the voltage regulator circuit. In FIGURE 3, the glow lamps 50' and 51' are connected in series with one another and connected in parallel with a resistor 57. The glow lamps 50' and 51' and the resistor 57 form a delta connection. The junction of the glow lamps 50' and 51' is connected to the junction between the capacitors 43 and 44 and to one end of the secondary winding 37. On the other hand, the junction of the glow lamp 50' and the resistor 57 is connected to one end of the voltage doubler circuit through a resistor 56, while the junction of the glow lamp 51' and the resistor 57 is connected to the other end of the voltage doubler circuit through a resistor 58.

Seen in FIGURE 4 is an alternate embodiment of the timing light circuit of the present invention. The circuit of FIGURE 4 is provided with a transistor oscillator designated generally by reference numeral 60. The transformer 20′ is provided with a primary winding 61 which has a center tap 62 which is connected to the clip 32 via the switch 23. Also, associated with the transformer 20′ is a secondary winding 63 which is connected to the voltage doubler circuit in a manner similar to the secondary winding 37 of FIGURES 1 and 2. Also, formed on the transformer 20′ is a tertiary winding 64 which has a center tap 66.

A diode 67 is connected in series with the clip 35 and the current limiting resistor 36′ to prevent damage to the timing light should it be connected to a voltage source in the wrong polarity. The oscillator circuit 60 is provided with a pair of transistors 68 and 69 each of which have their base connected through opposite ends of the tertiary winding 64 and through a resistor 70 to the clip 32. The resistor 36′ is selected to limit the current through the emitter collector junctions of the transistor 68 and 69 to a safe valve when the timing light is connected to a twelve volt source. The core 38′ of the transformer 20′ and the current limiting resistor 36′ are selected to cause substantial saturation of the core when the timing light is connected to a six volt power source. Therefore, the circuit arrangement shown in FIGURE 4 operates substantially in the same manner as the circuit arrangement shown in FIGURES 1 and 2 with the exception that the inverter circuit is an oscillator rather than an electromechanical vibrator.

FIGURE 5 shows a modified form of the circuit arrangement shown in FIGURE 4 which includes a voltage regulator circuit having substantially the same form as the voltage regulator circuit shown in FIGURE 3. That is, the glow lamps 50′ and 51′ and the resistor 57 are connected in delta with the junction of the glow lamps connected to the junction of the capacitors 43 and 44 and the junction of the glow lamp 50′ and the resistor 57 being connected to one end of the voltage doubler circuit through the resistor 56, while the junction of the glow lamp 50′ and resistor 57 is connected to the other end of the voltage doubler circuit through the resistor 58.

Therefore, the timing light of the present invention provides a new and improved circuit arrangement wherein the potential applied to energizing electrodes of a flash tube is maintained relatively constant irrespective of the potential of the power source to which it is connected. This insures that the potential applied between the electrodes of 14a and 14b of the flash tube 14 is maintained slightly below the ionization potential of the flash tube. Therefore, the flash tube will be energized only when a signal pulse is delivered to the excitation grid 16.

It will be understood that variations and modifications may be effected without departing from the spirit and scope of the novel concepts of this invention.

I claim as my invention:

1. A timing light of the character described for operation from a DC voltage source having a two to one voltage range, said timing light comprising:
   a flash tube including means for sensing synchronous impulse signals,
   means connected between said voltage source and said flash tube for causing said flash tube to be energized in synchronism with said impulse signals,
   said means including a step-up transformer having a center tapped primary winding and a secondary winding and an iron core, said core being magnetically saturated when the timing light is connected to a voltage source of the lower range,
   a vibrator connected in circuit with said primary winding,
   an electric switch connected in series with primary winding,
   two solid-state diode rectifiers and two capacitors arranged as a voltage doubling circuit and connected to said secondary winding of said transformer,
   a storage capacitor connected across said voltage doubler circuit,
   a series resistor and capacitor branch connected across said secondary winding of said transformer,
   a bleeder resistor connected across said storage capacitor, and
   regulator means for automatically regulating the voltage applied to said flash tube for effective operation thereof, said regulating means including a plurality of resistors and glow lamps.

2. A timing light of the character described for operation from a DC voltage source having a two to one voltage range, said timing light comprising:
   a flash tube including means for sensing synchronous impulse signals,
   means connected between said voltage source and said flash tube for causing said flash tube to be energized in synchronism with said impulse signals,
   said means including a solid-state diode, two transistors, and a step-up transformer having a center tapped primary winding, a secondary winding, and a center tapped tertiary winding and an iron core, said core being magnetically saturated when said timing light is connected to the voltage source and said voltage source is at its minimum value,
   said transformer being connected in an oscillator circuit relationship with said diode and said transistors,
   an electric switch connected in series with said primary winding,
   two solid-state diode rectifiers and two capacitors connected to said secondary winding and arranged as a voltage doubling circuit,
   a storage capacitor connected across said voltage doubling circuit,
   a bleeder resistor connected across said storage capacitor, and
   regulator means for automatically regulating the voltage applied to said flash tube, said regulator means including a plurality of resistors and a plurality of glow lamps.

3. A timing light for use in testing the ignition circuit timing of internal combustion engine systems, and which systems include a DC power source, the power source of certain ones of the systems being a fixed predetermined value and the power source of certain other ones of the systems being greater than said predetermined value, said timing light comprising:
   inverter means connectable to the DC power source of the system under test, said inverter means functioning to change the DC voltage from said DC power source to an AC voltage,
   a rectifier circuit,
   a saturable core set-up transformer connected between said inverter means and said rectifier circuit for producing an alternating current voltage from said DC voltage, said saturable core transformer being saturated when said DC voltage is at said fixed predetermined value,
   a flash tube connected to the output of said rectifier circuit for receiving energizing voltage therefrom;
   pulse signal means connectable to the ignition circuit of the system under test for causing said flash tube to be energized in synchronism with said ignition circuit; and
   means including said saturable core step-up transformer for automatically maintaining the voltage applied to said flash tube at substantially the same value irrespective of the value of the DC power source of the system under test.

4. A timing light of the character described for operation from a DC voltage source of one value during one instance and from a DC voltage source of a lower value during another instance, comprising:

A DC to AC converter arranged for connection to the voltage source, a step-up transformer having input and output terminals, said input terminals connected to said converter for receiving alternating current voltage therefrom, rectifier means connected to the output terminals of said step-up transformer, a flash tube connected to said rectifier means; and means connected to said flash tube to apply synchronous pulses thereto to initiate conduction of said flash tube, the improvement therein comprising, said step-up transformer including a core of magnetic material which becomes fully magnetically saturated when the timing light is connected to the lower value DC voltage source.

5. A timing light according to claim 4 further including regulator means connected in circuit with said rectifier means for regulating the voltage applied to said flash tube.

References Cited

UNITED STATES PATENTS

| | | | |
|---|---|---|---|
| 2,703,376 | 3/1955 | Board | 315—219 |
| 2,959,711 | 11/1960 | Parmater et al. | 315—224 |
| 3,004,191 | 10/1961 | Umbarger | 315—219 |
| 3,007,081 | 10/1961 | Sebastian | 315—205 |
| 3,011,094 | 11/1961 | Kapteyn | 320—1 |
| 3,310,723 | 11/1967 | Schmidt et al. | 320—1 |

JAMES W. LAWRENCE *Primary Examiner.*

C. R. CAMPBELL, *Assistant Examiner.*